(12) United States Patent
Cheiky et al.

(10) Patent No.: US 6,558,849 B2
(45) Date of Patent: May 6, 2003

(54) BATTERY SEPARATOR WITH COPPER-CONTAINING INORGANIC SALT

(75) Inventors: Michael Cheiky, Santa Barbara, CA (US); Wilson Hago, Ventura, CA (US)

(73) Assignee: Zinc Matrix Power, Inc., Santa Barbara, CA (US)

(*) Notice: Subject to any disclaimer, the term of this patent is extended or adjusted under 35 U.S.C. 154(b) by 118 days.

(21) Appl. No.: 09/839,871

(22) Filed: Apr. 19, 2001

(65) Prior Publication Data

US 2002/0182499 A1 Dec. 5, 2002

(51) Int. Cl.⁷ ................................................ H01M 2/16
(52) U.S. Cl. ........................ 429/251; 429/247; 429/248; 429/216; 429/232; 429/229; 429/27; 429/28; 429/29
(58) Field of Search ................................. 429/247, 248, 429/251, 216, 232, 27, 28, 229, 29

(56) References Cited

U.S. PATENT DOCUMENTS

| | | |
|---|---|---|
| 4,154,912 A | 5/1979 | Philipp et al. |
| 4,272,470 A | 6/1981 | Hsu et al. |
| 4,327,164 A | 4/1982 | Feinberg et al. |
| 4,371,596 A | 2/1983 | Sheibley et al. |
| 4,434,215 A | 2/1984 | Wszolek et al. |
| 4,479,856 A | 10/1984 | Ando |
| 4,592,973 A | 6/1986 | Pemsler et al. |
| 5,302,475 A | 4/1994 | Adler |
| 5,626,988 A | 5/1997 | Daniel-Ivad et al. |
| 5,681,672 A | 10/1997 | Lee |
| 5,780,186 A | 7/1998 | Casey, Jr. |
| 5,824,434 A | 10/1998 | Kawakami et al. |
| 5,830,601 A * | 11/1998 | Lian et al. .................. 429/198 |
| 6,033,806 A | 3/2000 | Sugihara et al. |
| 6,153,328 A | 11/2000 | Colborn |

\* cited by examiner

*Primary Examiner*—Patrick Ryan
*Assistant Examiner*—Angela J Martin
(74) *Attorney, Agent, or Firm*—Marvin E. Jacobs

(57) ABSTRACT

A battery separator containing cellulose and an insoluble inorganic salt of copper ions when placed in a zinc-based battery, minimizes zinc dendrite formation to extend battery cycle life.

8 Claims, 1 Drawing Sheet

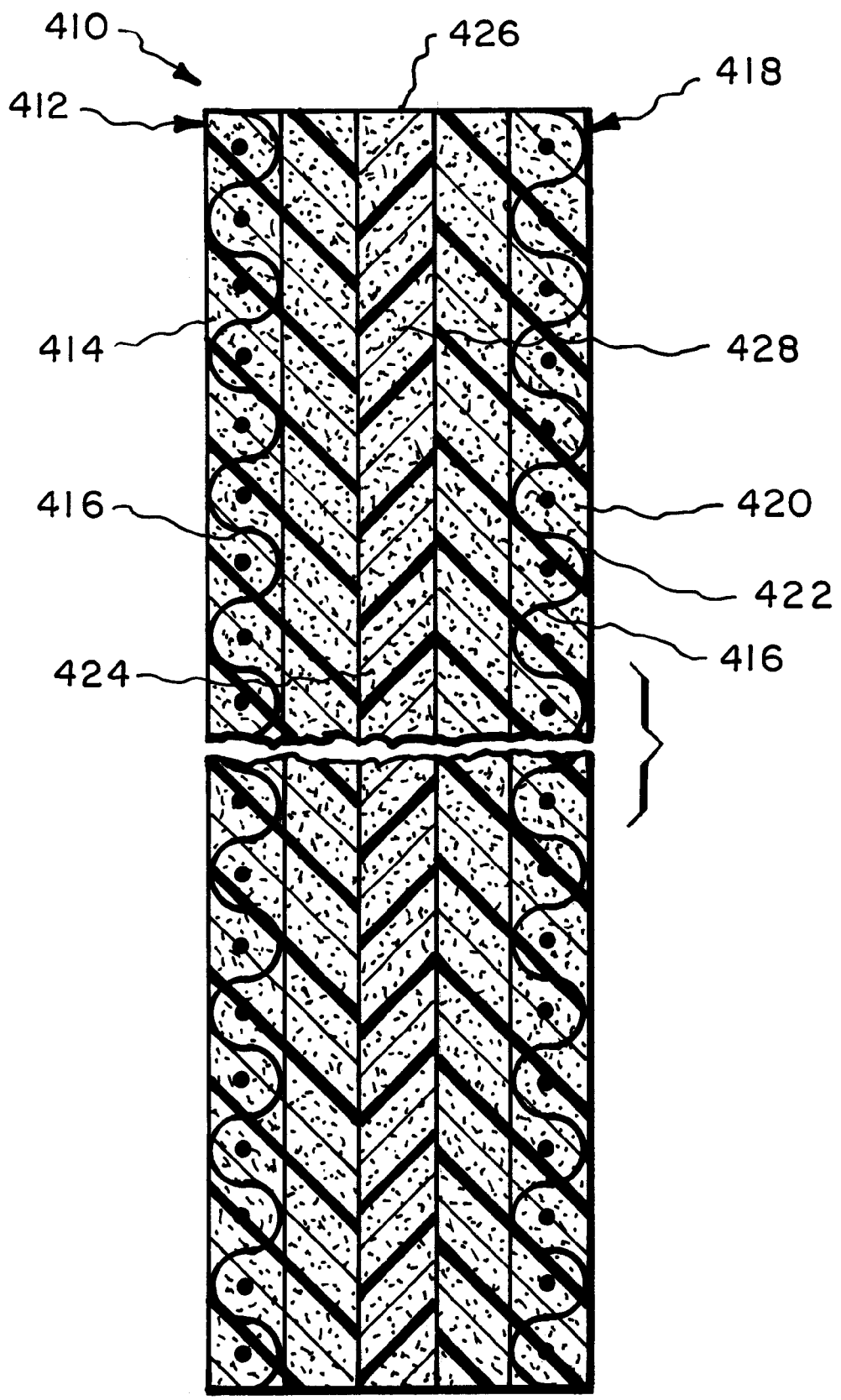

BATTERY SEPARATOR WITH COPPER-CONTAINING INORGANIC SALT

TECHNICAL FIELD

This invention relates to a separator for an alkaline battery, in particular to a separator in an alkaline zinc-based battery, containing an insoluble inorganic salt, in particular a salt containing copper ions.

BACKGROUND OF THE INVENTION

A zinc-based battery presents many challenges for the battery manufacturer. One of these challenges involves containing zincate diffusion within the battery. This is a particularly severe problem because zinc is extremely soluble in the strongly alkaline environments routinely used as the electrolyte in battery. The presence of KZn(OH)x where x=1 to 3 presents a double-edged sword for the battery designer. The high solubility allows for rapid current spikes typically unattainable with other battery systems. On the other hand, this high solubility permits diffusion of zinc ions to undesired locations within the battery, which upon re-plating leads to the well-known phenomenon of electrode shape change within zinc batteries. This shape change entails an agglommeration of the zinc towards the center of the battery with concomitant depletion from the edges.

Additionally, and more seriously, a problem arising from this high zinc mobility entails the accumulation of zinc dendrites within the separator as the battery cycles. Soluble zinc, driven by the electric field of the battery, finds its way through the pores of the separator. A concentration gradient within the separator leads, upon zinc re-plating, to dendrite formation. The dendrites are small tree-like metal formations that are capable of ripping the separator and prompting a cell short.

STATEMENT OF THE PRIOR ART

Prior art in this area has focused on diminishing dendrite formation by a variety of techniques. One technique involves physically diminishing the presence of zinc in critical areas where dendrite formation is not wanted. Thus, Colburn in U.S. Pat. No. 6,153,328 discloses a metal/air fuel cell that contains dendrite elimination zones characterized by the substantial lack of zinc in the volume of the zone and the substantial presence of a cell positive electrode through the volume.

Another approach involves adding complexing agents to the zinc electrode or adding agents to the electrolyte in order to suppress crystal growth. Lian et al in U.S. Pat. No. 5,830,601 teach an electrolyte active species comprising a metal hydroxide such as KOH or NaOH, and modifier such as a metal porphine, and/or a polyvinyl resin such as polyvinyl alcohol or polyvinyl acetate. Kawakami, et al in U.S. Pat. No. 5,824,434 use a multi-layered metal oxide film next to the zinc. U.S. Pat. No. 5,681,672 by Lee teaches adding barium fluoride to the electrolyte solution as a remedy for zinc dendrites. Adler et al in U.S. Pat. No. 5,302,475 use an electrolyte containing KOH and a combination of KF and $K_2CO_3$ salts, whereas Ando in U.S. Pat. No. 4,479,856 includes a quaternary ammonium salt and at least two metal ions selected from the group consisting of lead, tin and cadmium ions as dendrite inhibitor added to the electrolyte.

Another approach involves changing the electric field experienced by zinc. U.S. Pat. No. 5,780,186 by Casey, Jr. discloses specially treated zinc that fills the pores of a porous metal substrate. The use of indium sulphate as a coating agent for zinc is indicated in U.S. Pat. No. 5,626,988 by Daniel-Ivad, et al.

Yet another approach to prevent zinc dendrites has been to modify the separator. U.S. Pat. Nos. 4,154,912 and 4,272,470 feature crosslinks of polyvinyl alcohol by acetalization which supposedly forms networks between the molecules, thereby impeding zinc migration. In U.S. Pat. No. 6,033,806, Sugiura, et al discuss a similar crosslinked polyvinyl alcohol separator comprising additional steps involving an oxidizing agent to effect oxidative cleavage of 1,2-diol units and then acetalizing a film of crosslinked polyvinyl alcohol. Pemsler, et al in U.S. Pat. No. 4,592,973 disclose a separator with a hydrophobic microporous membrane whose pores are filled with a liquid ionic transport agent comprising an organic agent dissolved in an organic solvent. In U.S. Pat. No. 4,434,215, Wszolek, et al discloses a zinc-dendrite resistant separator made from copolymers of ethylene and acrylic or methacrylic acid. Shibley et al disclose in U.S. Pat. No. 4,371,596 a separator made from a porous, flexible substrate coated with an alkaline insoluble thermoplastic rubber-based resin and an alkaline reactive polar organic plasticizer along with polar particulate filler materials. A separator having the ingredients of a thermoplastic rubber, an inert filler and a processing agent selected from stearic acid, stearic acid metal salts, stearic acid amides, and natural or synthetic waxes is demonstrated in U.S. Pat. No. 4,327,167 by Feinberg et al.

STATEMENT OF THE INVENTION

The present invention provides a regenerated cellulose film resistant to zinc migration. This has been achieved by embedding an inorganic salt containing copper cations within the separator. The novel aspect of the present invention is that the copper salt impedes ready passage of zinc ions through the separator.

The battery separator of the present invention comprises cellulose, optionally containing hydrophobic agents, and an inorganic salt containing an insoluble copper(I) or copper(II) salt in a concentration range of 2 to 25% weight of said separator. This separator when placed in a zinc battery minimizes zinc dendrite formation and extends battery cycle life.

The novel aspect of our invention is to use a copper salt, embedded in a cellulose-based separator, as a dendrite inhibitor. Cellulose remains an excellent material as a separator for alkaline batteries because of its excellent ion transport properties and low electrical impedance. It has been used since World War II in the form of cellophane as the preferred separator material for zinc-based batteries. Cellulose as modified by the invention has enhanced ability to resist zinc dendrite penetration in an alkaline environment.

BRIEF DESCRIPTION OF THE DRAWINGS

The FIGURE is a cross-sectional view of a battery containing a separator film according to this invention.

DETAILED DESCRIPTION OF THE INVENTION

Referring now to the FIGURE, a zinc alkaline battery 410 includes an anode 412, cathode 418 and separator 426 disposed between the anode 412 and cathode 418. The anode can comprise a high surface area conductive support such as a silver coated screen 414 embedded with a layer 424 of zinc paste. The cathode 418 can include a high surface area support 420 such as a silver screen supporting a layer 422 of silver containing silver paste. The separator 426 according to the invention comprises a sheet 426 of regenerated cellulose containing particles 428 of a copper salt and is saturated with alkaline electrolyte such as KOH. Optionally, sheet 416 of regenerated cellulose separator may be present on either or both sides of the separator sheet 426.

Cellulose is a well-known getter for heavy metals. Its hydroxyl groups bind effectively to the d-orbitals of these metal ions. It is likely that similar bonding occurs in the case of zinc and copper. The present invention aims to encapsulate copper ions with cellulose molecules and thereby bind the copper ions strongly to free hydroxyls in cellulose. Bound cellulose should then form a network that prevents access to zinc ions and, consequently, eventual zinc deposition accompanied by zinc dendrites.

The encapsulation of the active salt is effected as follows. A solution of cellulose, with a degree of polymerization from 200 to 1200, in the form of, but not limited to, microcrystalline cellulose, cotton fiber, paper and microgranular cellulose, is dissolved using a variety of different solvents, including, but not limited to, LiCl/DMAC, trifluoroacetic acid and N-morpholine N-oxide. With LiCl/DMAC the applicable range is 3 to 8% weight LiCl to DMAC and the applicable range for the % weight solution of cellulose to solvent is 1 to 11%. The dissolved cellulose may be crosslinked by a variety of methods, including reacting it with an alkyl dihalide.

The hydrogen permeable material preferably forms hydrogen permeable domains within the regenerated cellulose film. The material is preferably soluble in a common solvent to cellulose so that the domains form on casting. Suitable hydrogen permeable materials are cellulose ethers in which the ether group contains 2 to 8 carbon atoms and is present in the separator film in an amount from 10 to 60 parts by weight to 100 parts by cellulose.

A copper(I) or (II) containing salt, in the solubility range of 10 ng/ml to 10 mg/ml is added to the solution as suspension. Salts meeting this criteria include, but are not limited to, copper hydroxide, copper oxalate, copper iodide, copper cyanide, and copper phosphate.

The resulting mixture is then cast via conventional methods. These methods are known to those skilled in the art of membrane fabrication. They include extrusion of the solution onto a conveyor belt, casting onto a glass plate with a casting knife or casting onto a well-leveled glass plate.

After casting, the resulting solution is coagulated with conventional techniques, preferably using water as the coagulating agent. Coagulation may be attained either by exposure to ambient moisture or by direct application of a water stream to the resulting solution. The coagulated cellulose material is then washed to remove the solvent and the LiCl salt. The copper salt, because of its relative insolubility, will remain in the gel. It is possible to employ alcohols mixed with water, but it is preferable that they be kept below 50% volume ratio.

After thorough washing of the resulting gel, the gel may be dried by any conventional methods, including air-drying, press-drying, or vacuum drying.

EXAMPLE 1

The film illustrated in the figure was made by dissolving 40 grams of microcrystalline cellulose placed in a solution of 2 kg of 5% LiCl/DMAC. The solution was heated to 120 degrees Celsius for 15 minutes. The cooled solution affords a clear solution of microcrystalline cellulose. 26.7 grams of ethyl cellulose is dissolved in 530 ml DMAC separately. The microcrystalline cellulose and the ethyl cellulose solutions are combined in a 60/40 weight ratio by polymer weight. To this mixture 8 g $Cu(OH)_2$ is added and stirred for 15 minutes. 40 ml of the combined solution is placed on a glass tray. A humidifier providing water over the glass tray yields a gelled product containing phases of microcrystalline cellulose and ethyl cellulose. This gel is then washed with water repeatedly until all DMAC and LiCl are removed. The gel is then dried with a press-dry, affording a blue film useful as a separator.

Said separator is tested for zinc migration as follows. A cavity with two compartments has a separator dividing the two compartments. One compartment contains 20 ml of saturated amount of zinc in electrolyte while the other compartment has 20 ml of plain electrolyte. The migration of zinc from the saturated side to the zinc-free side is detected at stated time intervals via atomic absorption spectroscopy. Results are reported in ppm of Zn.

TABLE 1

| FILM TYPE | PPM Zn |
| --- | --- |
| UNDOPED FILM | 20000 |
| DOPED FILM A | 5600 |
| DOPED FILM B | 2800 |
| DOPED FILM C | 6800 |

It is to be realized that only preferred embodiments of the invention have been described and that numerous substitutions, modifications and alterations are permissible without departing from the spirit and scope of the invention as defined in the following claims.

What is claimed is:

1. A separator for a zinc alkaline battery comprising a film of regenerated cellulose containing a dispersion of particles of a copper salt present in an amount from 2 to 25% by weight of the film.

2. A separator according to claim 1 in which the copper salts are selected from the group consisting of copper hydroxide, copper oxalate, copper iodide, copper cyanide and copper phosphate.

3. A separator according to claim 1 which the film has a thickness from 10 to 250 microns.

4. A separator according to claim 1 in which the film contains hydrogen permeable domains.

5. A separator according to claim 1 in which the film contains 10 parts to 60 parts of hydrogen permeable polymer.

6. A separator according to claim 1 in which the hydrogen permeable polymer is a cellulose ether in which the ether group contains 2 to 8 carbon atoms.

7. A separator according to claim 1 in which the polymer is ethyl cellulose.

8. A battery comprising a zinc anode electrode, a cathode electrode and a separator as defined in claim 1 disposed between the electrodes.

* * * * *